Sept. 16, 1952 R. L. DUNN 2,611,023
SOUND RANGING COMPUTER
Filed Feb. 15, 1951 5 Sheets-Sheet 1

INVENTOR.
RALPH L. DUNN
BY
Harry M. Saragovitz
Attorney

Sept. 16, 1952  R. L. DUNN  2,611,023
SOUND RANGING COMPUTER
Filed Feb. 15, 1951  5 Sheets-Sheet 2

FIG. 2

INVENTOR.
RALPH L. DUNN
BY Harry M. Saragovitz
Attorney

Sept. 16, 1952　　　　　R. L. DUNN　　　　　2,611,023
SOUND RANGING COMPUTER
Filed Feb. 15, 1951　　　　　　　　　　　5 Sheets-Sheet 3

FIG. 3

INVENTOR.
RALPH L. DUNN
BY
*Harry M. Saragovitz*
Attorney

Sept. 16, 1952     R. L. DUNN     2,611,023
SOUND RANGING COMPUTER Filed Feb. 15, 1951     5 Sheets-Sheet 4

FIG. 5

INVENTOR.
RALPH L. DUNN
BY
Harry M. Saragovitz
Attorney

Sept. 16, 1952     R. L. DUNN     2,611,023
SOUND RANGING COMPUTER Filed Feb. 15, 1951             5 Sheets-Sheet 5

INVENTOR.
RALPH L. DUNN
BY *Harry M. Saragovitz*
Attorney

Patented Sept. 16, 1952

2,611,023

UNITED STATES PATENT OFFICE 2,611,023

SOUND RANGING COMPUTER

Ralph L. Dunn, Neptune, N. J., assignor to the United States of America as represented by the Secretary of the Army Application February 15, 1951, Serial No. 211,173

10 Claims. (Cl. 177—352)

(Granted under the act of March 3, 1883, as amended April 30, 1928; 370 O. G. 757)

The invention described herein may be manufactured and used by or for the Government for governmental purposes, without the payment of any royalty thereon.

This invention relates to sound location and more particularly to an analogue computer used in connection with sound ranging systems for automatically plotting the location of a sound source by utilizing relative differences in arrival times of the sound at prescribed microphone locations.

The position of a sound source may usually be determined by measuring the differences in time of arrival of signals at each of a series of microphones, the locations of which are known. From the differences in arrival time, it is possible to determine groups of hyperbolas whose points of intersection may be utilized to determine the source of the sound. By selecting any three known microphone positions, these hyperbolas may be constructed by a close approximation method involving miscellaneous side calculations, and then applied to the surface of a plotting board. Obviously, this is a long and tedious process. Furthermore, with any change in microphone positions, a new set of hyperbolas would have to be drawn.

In the present invention, an electro-mechanical analogue of the problem is produced and the solution for the source of sound corresponding to the data from any three selected microphones may be accomplished automatically and rapidly without the need for any calculation on the part of the operator. It is an object of the present invention, therefore, to provide an electro-mechanical analogue computer which automatically indicates the bearings of a particular sound source.

It is another object of the invention to provide an electro-mechanical computer which will automatically and rapidly indicate the azimuth and range positions of a sound source by utilizing the difference of time of arrival of the sound at preselected microphone locations.

In accordance with the present invention there is provided an electro-mechanical analogue computer having means for simulating the position of the field microphones and an indicating device which may be positioned in accordance with direct current voltages proportional to the relative difference of time arrival at corresponding microphones. Connected to the indicating device and passing through each simulated microphone location are a series of thin wire tapes, or guide wires, each wire being attached to a spring-tensioned retaining drum to maintain constant tension on said wire. Means associated with each of these retaining drums are provided to simultaneously produce the direct current voltages which are proportional to the relative time difference of arrivals at the corresponding microphones. These voltages are then applied through suitable amplifiers to range and azimuth servo drive motors which position the indicating device to simultaneously indicate both the azimuth and range location of the sound source.

For a better understanding of the invention together with other and further objects thereof, reference is had to the following description taken in connection with the accompanying drawings in which.

Referring now to Figs. 1–5 of the drawings, the numeral 10 designates a flat plotting surface which may be conventionally mounted on a suitable base 12 by means of supports 14. By choosing an appropriate scale factor, for example, 1 inch=1000 yards, a portion of plotting surface 10 may graphically represent, in miniature, a prescribed area of field operation in plane polar or grid coordinates. A vertical line drawn through a datum, or reference point, may represent zero azimuth or any suitable reference azimuth and range may be represented by a series of arcs concentric about the datum point. Thus, any solution point on the calibrated portion of surface 10 may be designated in terms of range and azimuth. For purpose of explanation, plotting surface 10 may be considered as being divided into a calibrated, or front plotting section, and a rear functional section, the line of demarcation being a horizontal line drawn arbitrarily on surface 10 a short distance below the datum point.

Mounted perpendicular to surface 10 and extending therethrough is tubular shaft 16 rotatably mounted in fixed bearing housing 18. The longitudinal axis of shaft 16 passes through the datum point and the upper end of said shaft is provided with annular flange 20. Mounted coaxially within tubular shaft 16 and radially spaced therefrom is solid cylindrical shaft 22. Shaft 22 extends through both ends of tubular shaft 16, the upper end of shaft 22 being terminated by flange 24 to which is secured disc-shaped pulley 26. The lower end of shaft 22 is rotatably supported in position by bearing 28 which is affixed to horizontal plate 30. Plate 30 is intermediate base 12 and surface 10 and may be supported in position in any suitable manner.

Solid shaft 22 carries spaced preferably roller bearings 32, the inner races of which are secured to shaft 22 and the outer races of which are secured to the inner surface of tubular shaft 16. Similarly, tubular shaft 16 carries spaced preferably roller bearings 34, the inner races of which are secured to the outer surface of said tubular shaft and the outer races are secured to bearing housing 18 which is rigidly mounted to surface 10 and extends therethrough. Tubular shaft 16 may be supported in position by means of annular retainer disc 36. By this arrangement it can readily be seen that shafts 16 and 22 may be rotated independently of each other.

Spaced from plotting surface 10 and parallel thereto is an elongated plotting arm 38 provided with a central longitudinal slot 40 which extends for substantially the entire length of said plotting arm. One end of said plotting arm is rigidly mounted to annular flange 20 on shaft 16 by means of screws 42 and 44 (Fig. 5) in such a manner that it is free to pivot around shaft 22. The other end of said arm is adapted to move freely in the calibrated section of surface 10 and is supported in position by a non-swiveling castor 46, the axle of the contact wheels 48 being parallel to the longitudinal axis of plotting arm 38. Rotatably mounted at the free end of arm 38 adjacent slot 40 is guide pulley 50. If desired, means may be provided to position guide pulley 50 longitudinally along arm 38.

Mounted between the parallel edges of slot 40 and in slidable contact therewith, is plotting point carrier 52 comprising a horizontal slidable pen carrier member 54 and a vertical wire support member 56 which extends upwardly from said slidable member and is integral therewith. Slidable pen carrier member 54 is provided with a threaded stud 58 to which is secured one end of a thin wire tape 60. The other end of wire 60 is looped around guide pulley 50 and is secured in the grooved periphery of pulley 26. Wire support section 56 is provided with a central aperture 62 and a series of threaded studs 64, the purpose of which will hereinafter be explained.

Figure 5:
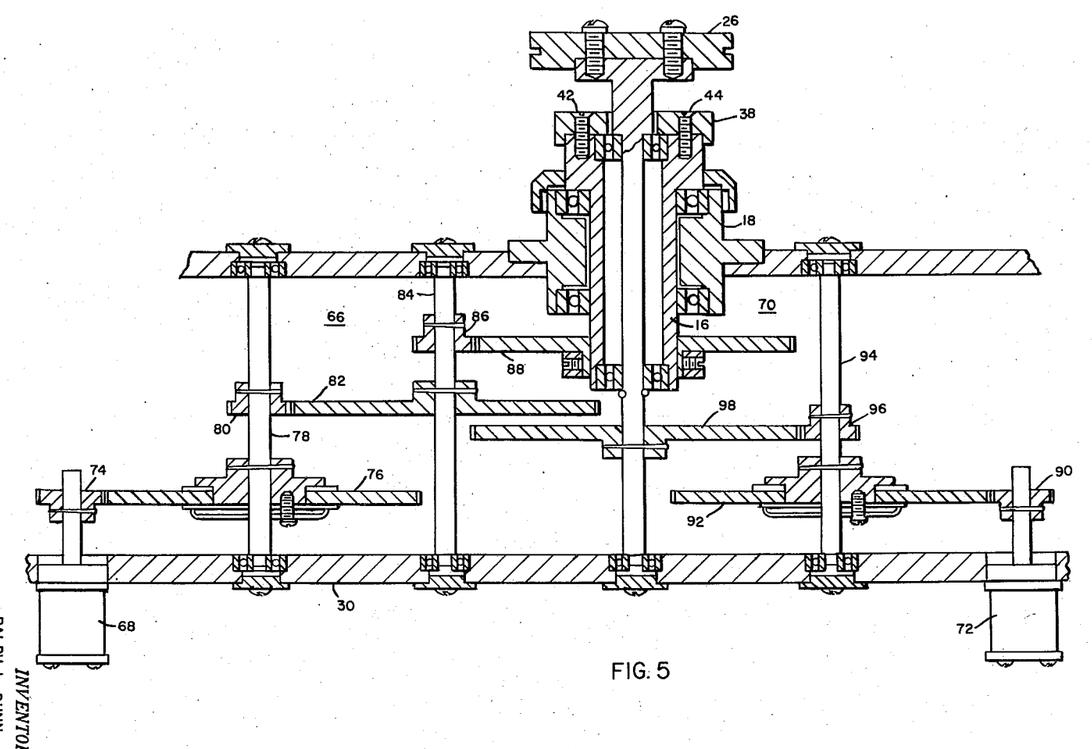
Fig. 5 is a vertical cross sectional view taken substantially along line III—III of Fig. 1.

As shown in Fig. 5 tubular shaft 16 is rotatably driven through suitable gearing 66 by servo drive motor 68, hereinafter referred to as the azimuth motor. Solid shaft 22 is rotatably driven thru suitable gearing 70 by servo drive 72, hereinafter referred to as the range motor. As shown, both motors are mounted on the underside of horizontal plate 30. Plotting arm 38, which determines the angular position, or azimuth, of plotting point carrier 52, is shown as resolved in azimuth from motor 68 by pinion 74 on the shaft of the azimuth servomotor, gear 76 on rotatable shaft 78, pinion 80 of the upper end of said shaft, a gear 82 on rotatable shaft 84, pinion 86 on the upper end of shaft 84, and gear 88 which is keyed to tubular shaft 16. Plotting point carrier 52 is shown as resolved in range from servomotor 72 by a pinion 90 on the shaft of said range motor, gear 92 on rotatable shaft 94, pinion 96 on the upper end of shaft 94, and gear 98 which is keyed to solid shaft 22.

A plotting point 97 which may be an inking type or an electric stylus, may be centrally mounted on the underside of slidable pen carrier member 54 in the conventional manner. If desired, plotting point 97 may be suspended during the transitory motion of plotting point carrier 52 by means of a solenoid 99 (Fig. 4) which is rigidly attached thereto. It is to be understood, of course, that the bottom of solenoid 99 is spaced from surface 10 so that it does not impede the angular movement of plotting arm 38.

Horizontally mounted on the rear functional section of surface 10 posterior bearing housing 18 is a guide arm assembly 100 which provides the means for relatively adjusting the miniature location of microphones to correspond to the actual relative locations of the microphone in the field. Guide arm assembly 100 includes a series of spaced movable guide arms 102 which are parallel to and coplanar with a fixed center guide arm 104. One end of center guide arm 104 is rigidly mounted on a vertical support post 106 which extends upwardly from the functional section of surface 10. The longitudinal axis of post 106 is parallel to and coplanar with the axis of shaft 22 and is so positioned that the other end of center arm 104 is substantially aligned with the datum, or reference, point and is spaced from the surface of pulley 26. Extending upwardly from the unattached end of center arm 104 is an eyelet 107 which may be considered as the miniature representation of a preferred datum, or reference, microphone corresponding to an actual microphone location in the field. For illustrative purposes, the reference microphone location may be designated by the letter C.

On either side of fixed center guide arm 104 there are provided one or more L-shaped movable guide arms 102. As stated above, the elongated portions of said movable guide arms are parallel to and coplanar with center arm guide 104. Each of said movable arm guides is mounted on a separate carriage 108 which is in sliding contact with spaced parallel guides 110 and 112 horizontally mounted on surface 10 between end brackets 114 and 116. In the embodiment illustrated in the drawing, two movable guide arms are provided on either side of center guide arm 104, and for each movable guide arm 102 there is a corresponding slidable carriage 108 which are identical in construction.

Carriage 108 is provided with a central longitudinal slot 118 to accommodate a threaded longitudinal shaft 120 which is rotatably mounted between carriage end walls 122 by means of suitable bearings. One end of shaft 120 is terminated by manually rotatable knob 126. The short or bent portion of L-shaped guide arm 102 is mounted between the walls of slot 118 and threadedly engages shaft 120. By this arrangement the longitudinal position of guide arm 102 may be adjusted within the confines of slot 118 by merely rotating knob 126 in one direction or the other.

To adjust each guide arm 102 laterally in relation to rigid center arm 104, a transverse threaded aperture 128 is centrally provided in the base of carriage 108 to engage threaded shaft 130 which is centrally positioned between spaced parallel guides 110 and 112 transverse to longitudinal shaft 120. The transverse shafts 130 are axially aligned, but are individually mounted in bearings 132 so that they may be rotated independently of each other. As shown, the outer transverse shafts are terminated by a manually rotatable knob 134. The inner transverse shafts may be rotated by means of beveled gears 136 and 138, in any suitable manner.

Figures 1, 4:
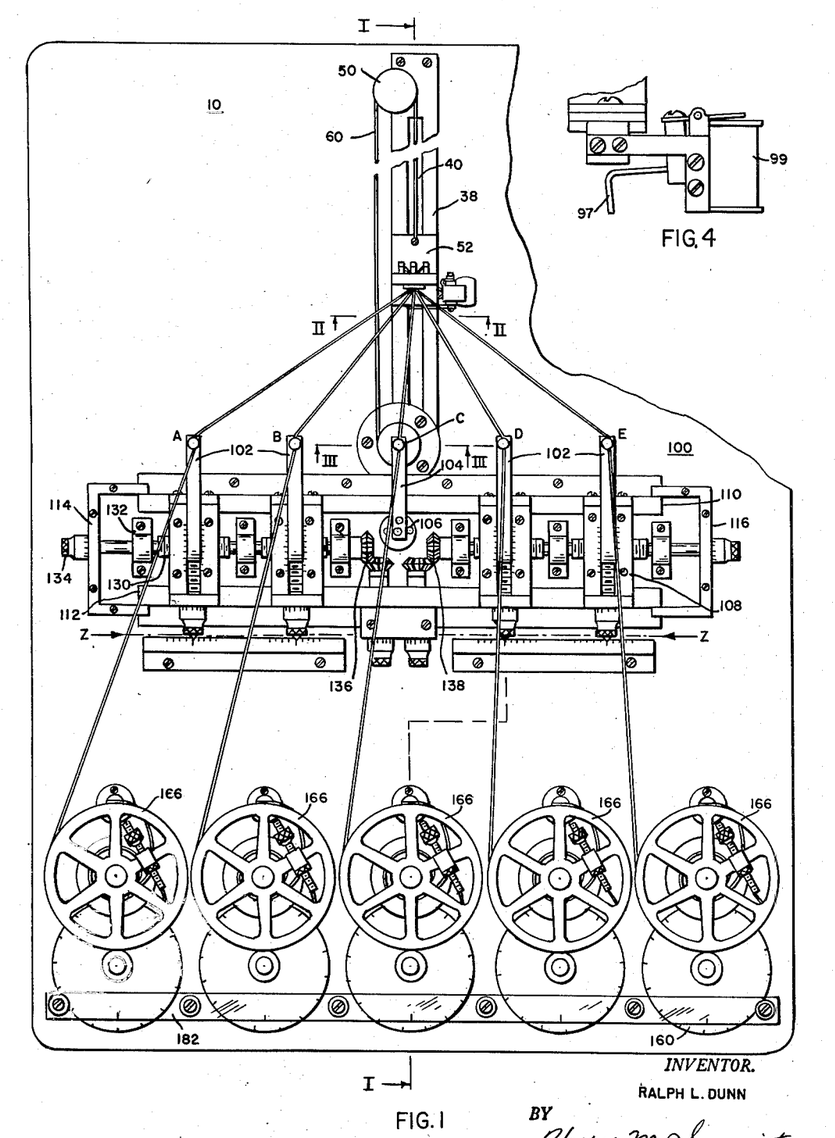
Fig. 1 is a plan view of the analogue computer.
Fig. 4 is an end plan view taken along line II—II of Fig. 1.
Figure 2:
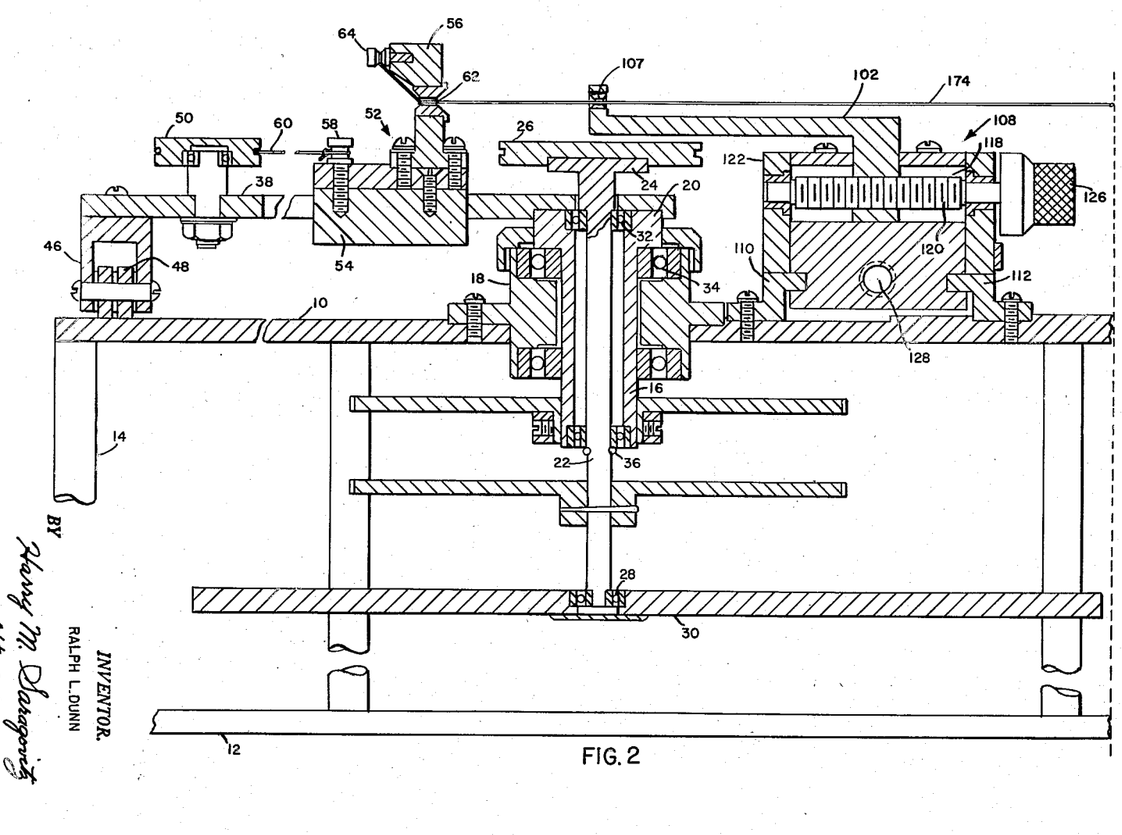
Fig. 2 is a vertical cross sectional view of the portion above line Z—Z of Fig. 1 taken substantially along line I—I.

Mounted at the end of the elongated portion of each guide arm and extending upwardly therefrom is an eyelet 107 which may be considered as the miniature representation corresponding to the remaining actual microphones in the field. Thus it can readily be seen that the miniature representation of the microphone locations may be relatively adjusted to correspond with the actual relative position of the microphones in the field. It is to be understood, of course, that all field microphones are assumed to be located in the same horizontal plane. As shown in Fig. 1, the remaining microphone locations are designated as A, B, D and E.

Figure 3:
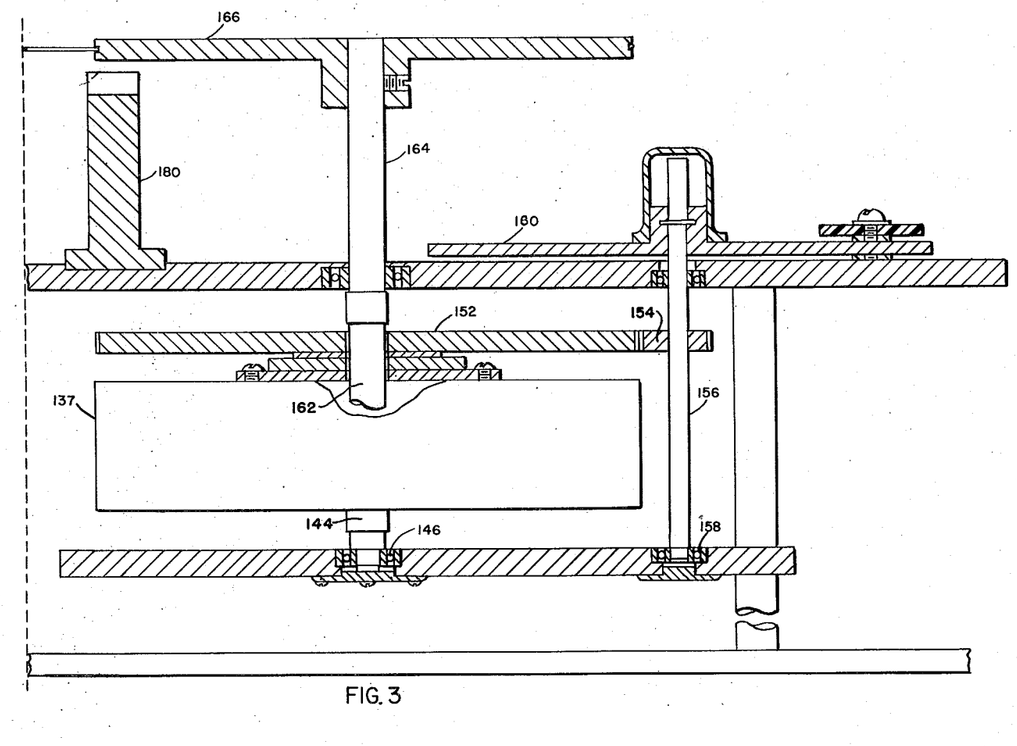
Fig. 3 is a vertical cross sectional view of the portion below line Z—Z taken substantially along line I—I of Fig. 1 (Fig. 3 together with Fig. 2 form one complete drawing)
Figure 6:
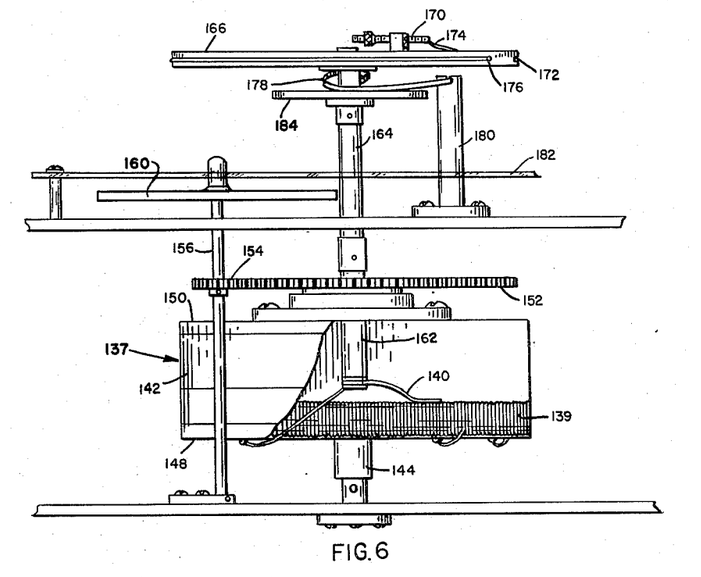
Fig. 6 is a perspective view showing the detailed construction of a potentiometer assembly embodied in my invention.

Five potentiometer assemblies are provided, one for each of the miniature microphone locations. These potentiometer assemblies and the parts connected to them are identical and this description therefore applies to each. Referring now to Figs. 3 and 6, potentiometer assembly 137 comprises a conventional resistive element 139 and a central rotating contact arm 140 conventionally mounted within cylindrical housing 142. As shown, resistive element 139 forms an integral part of cylindrical housing 142. Said housing is rotatably mounted in a horizontal plane below surface 10 by means of shaft 144, which is affixed to the base, or lower plate, 148 of cylindrical housing 142, and bearing 146. Mounted on upper plate 150 of said cylindrical housing is the hub of gear 152. Gear 152 meshes with a pinion 154 mounted on vertical shaft 156 which is rotatably mounted in bearings 158. One end of said shaft extends upwardly through surface 10 and is terminated by disc-like time difference dial 160 which is keyed to shaft 156. Contact arm 140 is affixed to one end of vertical shaft 162 which extends freely thru the hub of gear 152. The other end of shaft 162 is coupled to colinear shaft 164 which extends upwardly through surface 10.

Mounted horizontally upon the end of shaft 164 is the hub of a retaining drum 166 which is conventionally provided with spokes. Extending upwardly from one of said spokes and mounted horizontally thereon is a two-way thumb nut adjusting screw 170. The rim, or periphery of retaining drum 166 is provided with a groove 172 which is located in substantially the same horizontal plane as the eyelets 107 and aperture 62 of plotting point carrier 52. Attached at one end of thumb nut adjusting screw 170 is a guide wire 174 which extends through a hole 176 in the periphery of retaining drum 166 and is then looped about a portion of groove 172. Guide wire 174 then extends through eyelet 107 and aperture 62, and is secured at the other end to one of the threaded stubs 64 on wire support section 56.

For maintaining constant tension on guide wire 174, there is provided a flat coil spring 178 which is horizontally positioned on the underside of retaining drum 166. One end of said spring is attached to shaft 164 and the other end of said spring is rigidly attached to a vertical post 180 extending upwardly from surface 10. As illustrated, the top of post 180 is spaced from the underside of retaining drum 166. Preferably, post 180 may be positioned anterior shaft 164 and axially spaced therefrom a distance substantially equal to the radius of retaining drum 166. Spring 178 may be supported horizontally in position by a disc 184 which is mounted on shaft 164 on the underside of drum 166. Retaining drums associated with microphone locations A, B, C, D and E are located the same distance above surface 10, and the shafts upon which they are mounted are linearly aligned. Thus for each miniature microphone representation there is provided a potentiometer assembly, an associated time-difference dial, an associated retaining drum and an associated guide wire. It is to be assumed, of course, that the construction of corresponding elements are identical.

A narrow strip of Plexiglas 182 is mounted just above the surface of the time-difference dials with engraved lines to provide a zero reference point for each dial. The graduated scales on the dials progress from zero in either direction, one half being engraved in black, the other in red. The use of two colors provides a means of discrimination as to whether the time of sound arrival at one selected microphone is sooner or later than the time arrival of the sound at another selected microphone.

Figure 7:
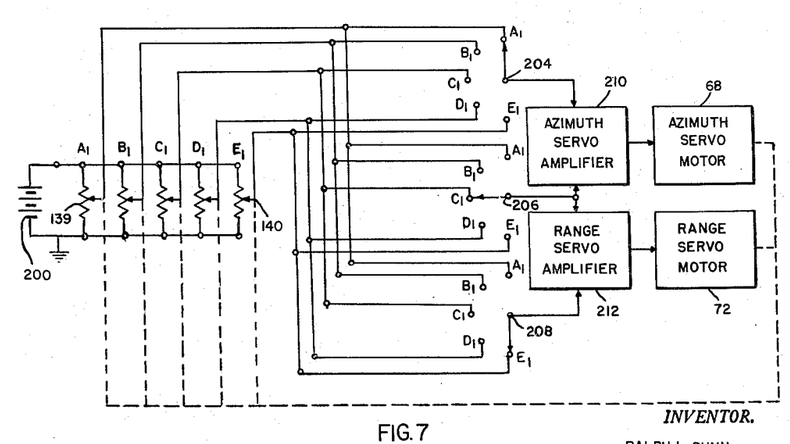
Fig. 7 illustrates the electrical connections embodied in my invention.

Fig. 7 illustrates the electrical components and connections embodied in my invention, $A_1$, $B_1$, $C_1$, $D_1$, and $E_1$ indicate the potentiometers which are associated with miniature microphone locations A, B, C, D and E, respectively as shown in Fig. 1. The resistive elements 139 are connected in parallel across a suitable positive potential source 200. Rotating contact arms 140 are connected to corresponding terminals of three selector switches 204, 206 and 208. The terminals of each switch are labeled $A_1$, $B_1$, $C_1$, $D_1$ and $E_1$ to indicate terminals which are associated with the contact arm of corresponding potentiometers. For example, contact arm 140 of potentiometer $A_1$ is connected to terminal $A_1$ of selector switches 204, 206 and 208, respectively, contact arm 140 of potentiometer $B_1$ is connected to terminal $B_1$ on said selector switches, etc. For convenience, selector switches 204, 206 and 208 may be respectively designated as Azimuth, Reference and Range switches. The output of Reference switch 206 is applied as a reference voltage to azimuth and range servo amplifiers 210 and 212, respectively. The output of Azimuth switch 204 is applied only to azimuth servo amplifier 210 and the output of Range switch 208 is applied only to range servo amplifier 212. The construction of these servo amplifiers are well known in the art and operate conventionally to modulate and amplify error voltages applied thereto. The output of azimuth servo amplifier 210 is applied to azimuth servomotor 68 and the output of range servo amplifier 212 is applied to range servomotor 72. The respective mechanical connections of said motors to plotting arm 38 and plotting point carrier 52 are described supra.

Thus, by the Azimuth switch, one may select the microphone to be user for comparative time difference and provide an error voltage to the azimuth channel of the servo system. The Range switch may similarly be used for an error voltage to be sent to the range channel. The Reference switch may be used to select a microphone position for comparing the error voltages corresponding to time arrival differences with both the position selected for the range channel and the position selected for the azimuth channel.

Before the computer may be placed into operation, it is essential that plotting point carrier 52 be initially positioned, or indexed, in relation to the microphone locations which are assumed to be positioned substantially along the same base line. This may be accomplished by positioning plotting point 97 at some prescribed plot, for example, 6,000 yard range at zero azimuth, and then milling out the resulting error voltages between the center microphone and the other microphone positions by means of the corresponding time difference dial 160, which in turn controls the relative position of the associated potentiometer resistors 139 with respect to contact arms 140. By this arrangement plotting point 97 may initially be set at rest on the center line of the plotting surface which is directly in front of the center microphone position, and the length of the guide wire, or tape, 174, for each microphone position may represent to scale, the actual distance from any sound source to the microphones in the field. Any slight discrepancy in error voltage may be adjusted by means of the two-way thumb nut adjusting screw 170 which positions center contact arm 140 in relation to potentiometer resistor 139. Spring 178 acts against the movement of retaining drum 172 to maintain constant tension on guide wire 174. With plotting point carrier 52 initially positioned as described, supra, the computer is now ready for operation.

Two time differences represented by two voltage differences supplied from the potentiometers are necessary for the computer to give a solution, and only two time differences may be used for any one computation. The selection of time differences, with regard to microphone positions, is accomplished by the selector switching arrangement described above which also allows the desired time or voltage difference to be applied to the appropriate servo amplifiers. The basis of operation of this system, is that the setting in of time differences on the bodies of the potentiometers establishes voltage differences between the pairs of contact arms of each of two pairs of potentiometers. These differences are applied to servo mechanisms which operate in such direction as to move the plotted point to a position where the voltage differences will be zero, which corresponds to the intersection of two separate hyperbolas. It is to be understood that the time differences may be set in manually or by any other suitable means.

As previously explained, three microphones may be used at one time. The combination of the five inputs to selector switches 204-208 and the three selected operative rotary contact arms 140 provide a total of 30 usable combinations that may be set up. However, to operate properly, the selected microphones must be such that the microphone selected as a reference is disposed between the other two selected microphone positions. For example, if microphone location C is selected as the reference, then the other two microphones to be used must include one on either side of microphone C. If microphone location D is selected as a reference, then one of the other microphones must be on one side of D and the other must be on the other side of D, for example, microphone locations A and E.

The information or intelligence to be set in may be supplied in the form of graphic recordings of the times of arrival of the sound at various microphone field positions. This information may be manually introduced as an error voltage at the respective potentiometer assemblies by means of the associated time difference dial 160.

As mentioned above, a suitable microphone may be selected as a reference and the associated time difference dial 160 positioned at the zero reference point provided therefor on Plexiglas 182. The times of arrival of a sound source at the two other selected microphones, with respect to the reference microphone may be designated as an "early" time and a "late" time, depending upon the relative distance of the source of sound from the microphones.

The "late" time is introduced to one of the selected microphone positions by means of the "black" numerals on the associated time difference dial. The "early" time is introduced to the other selected microphone position by means of the "red" numerals on the corresponding time difference dial. As explained above, by rotating the dials 160, the associated potentiometer bodies 142 are rotated relative to rotating contact arm 140, thus setting up error voltages with respect to the selected reference microphone location.

One error voltage is applied to range servomotor 72 through Range switch 208 and range servo amplifier 210, where it is compared to the reference voltage by means of Reference switch 206. Similarly, the other error voltage is compared to the output of the voltage corresponding to the reference microphone in azimuth servo amplifier 212, and the output of said servo amplifier is fed to azimuth servomotor 68. The servomotors operate in such a manner as to effectively cancel out the error voltage. In other words, the error voltages are nulled out and the plotting point comes to rest at a plot representing the intersection of two separate hyperbolas.

Azimuth servomotor 68 rotates shaft 34 through gear mechanism 66 and range servomotor 72 rotates shaft 22 through gear mechanism 70. As hereinbefore explained, shaft 34 controls the angular position of plotting arm 38 and shaft 22 controls the position of the pen carrier along longitudinal slot 40. As the plotting point carrier is positioned by the servomotor drives, the center contact arms 140 of the selected potentiometers are actuated by the movement of the guide wires 174 until the error voltages are nulled out. At this instant, plotting point 97 will rest on the solution point corresponding to the time differences as represented at the selected microphone positions. The tension of the guide wires is maintained constant by the action of spring 178 against the movement of retaining drum 166. Similarly, any three other microphones may be operated in the same manner to obtain either a series of plots for one sound source, or for another sound source as desired.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A sound locating device for use with a sound ranging system wherein a plurality of microphones are employed in a prescribed field of operation to record the relative arrival times of a source of sound, comprising a flat surface, a portion of said surface being calibrated to reproduce said field of operation in miniature and to scale, said calibrated surface having a prescribed datum point, means mounted on said calibrated surface for reproducing in miniature and to scale the location of the field microphones relative to said datum point, an elongated plotting arm operable on said calibrated surface and adapted to pivot about said datum point, a plotting point carrier slidably mounted on said plotting arm, means associated with each of said reproduced microphone locations for indicating the difference in arrival times of a particular sound source at each reproduced microphone location with respect to a prescribed selected microphone location, and means drivenly connected to said time difference indicating means for simultaneously pivoting said plotting arm about said datum point and positioning said plotting point carrier along said arm.

2. A sound locating device for use with a sound ranging system wherein a plurality of microphones are employed in a prescribed field of operation to record the relative arrival times of a source of sound, comprising a flat surface, a portion of said surface being calibrated to reproduce said field of operation in miniature and to scale, said calibrated surface having a prescribed datum point, means mounted on said calibrated surface for reproducing in miniature and to scale the location of the field microphones relative to said datum point, an elongated plotting arm operable on said calibrated surface and adapted to pivot about said datum point, a plotting point carrier slidably mounted along the longitudinal axis of said plotting arm, means for indicating the difference in arrival times of a particular sound source at each microphone location with respect to a prescribed selected microphone location, means for selecting two of the time arrival differences for said particular sound source, means for converting said selected time differences to corresponding error voltages having the same proportion relative to each other as said selected time differences, and means responsive to said error voltages for pivoting said plotting arm about said datum point and simultaneously positioning said plotting point carrier along the longitudinal axis of said plotting arm.

3. A sound locating device for use with a sound ranging system wherein a plurality of microphones are employed in a prescribed field of operation to record the relative arrival times of a source of sound, comprising a flat surface, a portion of said surface being calibrated to reproduce said field of operation in miniature and to scale, said calibrated surface having a prescribed datum point, means mounted on said calibrated surface for reproducing in miniature and to scale the location of the field microphones relative to said datum point, an elongated plotting arm operable on said calibrated surface and adapted to pivot about said datum point, a plotting point carrier slidably mounted along the longitudinal axis of said elongated plotting arm, means for indicating the difference in arrival times of a particular sound source at each reproduced microphone location with respect to a prescribed selected microphone location, means for selecting two of said time arrival differences for said particular sound source, means for converting said selected time differences to corresponding error voltages having the same proportion relative to each other as said selected time differences, a first servomotor responsive to one of said error voltages and drivenly connected to said plotting arm, a second servomotor responsive to the other of said error voltages and drivenly connected to said plotting point carrier, and means responsive to the combined movement of said plotting arm and said plotting point carrier for nulling out said error voltages whereby said carrier is substantially positioned at the location of said particular sound source.

4. A sound locating device for use with a sound ranging system wherein a plurality of microphones are employed in a prescribed field of operation to record the relative arrival times of a source of sound, comprising a flat surface, a portion of said surface being calibrated to reproduce said field of operation in miniature and to scale, said calibrated surface having a prescribed datum point, means mounted on said calibrated surface for reproducing in miniature and to scale the location of the field microphones relative to said datum point, an elongated plotting arm operable on said calibrated surface and adapted to pivot about said datum point, a plotting point carrier slidably mounted along the longitudinal axis of said elongated plotting arm, means for indicating the difference in arrival times of a particular sound source at each reproduced microphone location with respect to a prescribed selected microphone location, means for selecting two of said time arrival differences for said particular sound source, means for converting said selected time differences to corresponding error voltages having the same proportion relative to each other as said selected time differences, means responsive to said error voltages for pivoting said plotting arm about said datum point and simultaneously positioning said plotting point carrier along the longitudinal axis of said plotting arm, and means responsive to the longitudinal movement of said plotting point carrier to null out said error voltages whereby said plotting point carrier is substantially positioned at the location of said particular sound source.

5. A sound locating device for use with a sound ranging system wherein a plurality of microphones are employed in a prescribed field of operation to record the relative arrival times of a source of sound, comprising a flat surface, a portion of said surface being calibrated to reproduce said field of operation in miniature and to scale, said calibrated surface having a prescribed datum point, means mounted on said calibrated surface for reproducing in miniature and to scale the location of the field microphones relative to said datum point, an elongated plotting arm operable on said calibrated surface and adapted to pivot about said datum point, a plotting point carrier slidably mounted along the longitudinal axis of said elongated arm, means for indicating the difference in arrival times of a particular sound source at each reproduced microphone location with respect to a prescribed selected microphone location, means for selecting two of said time arrival differences for said particular sound source, means for converting said selected time differences to corresponding error voltages having the same proportion relative to each other as said selected time differences, means responsive to one of said error voltages for pivoting said plotting arm about said datum point, means responsive to the other of said error voltages for longitudinally positioning said plotting arm carrier along said plotting arm, and means responsive to the movement of said plotting point carrier to null out said error voltages whereby said plotting point carrier is substantially positioned at the location of said particular sound source.

6. A sound locating device for use with a sound ranging system wherein a plurality of microphones are employed in a prescribed field of operation to record the relative arrival times of a source of sound, comprising a flat surface, a portion of said surface being calibrated to reproduce said field of operation in miniature and to scale, said calibrated surface having a prescribed datum point, means mounted on said calibrated surface for reproducing in miniature and to scale the location of the field microphones, an elongated plotting arm operable on said calibrated surface and adapted to pivot about said datum point, a plotting point carrier slidably mounted along the longitudinal axis of said elongated plotting arm, means for selecting one of said reproduced microphone locations as a reference corresponding to zero arrival time of a particular sound source, means associated with each of the reproduced microphone locations for converting the respective difference in arrival times of said particular sound source at said remaining microphone locations to corresponding error voltages having the same proportion relative to each other as said time differences, means for selecting two of said error voltages, means responsive to one of said error voltages for pivoting said plotting arm about said datum point, means responsive to the other of said error voltages for longitudinally positioning said plotting point carrier along said plotting arm and means responsive to the movement of said plotting point carrier to null out said error voltages whereby said plotting point carrier is substantially positioned at the location of said particular sound source.

7. A sound locating device associated with a sound ranging system wherein a plurality of microphones are employed in a prescribed field of operation to record the relative arrival times of a source of sound, comprising a flat surface, a portion of said surface being calibrated to reproduce said field of operation in miniature and to scale, said calibrated surface having a prescribed datum point, means mounted on said calibrated surface for reproducing in miniature and to scale the location of the field microphones, an elongated plotting arm operable on said calibrated surface and adapted to pivot about said datum point, a plotting point carrier slidably mounted along the longitudinal axis of said elongated plotting arm, means for selecting one of said reproduced microphone locations as a reference corresponding to zero arrival time of a particular sound source, means associated with each of the reproduced microphone locations for converting the respective relative difference in arrival times of said particular sound source at said remaining microphone locations to corresponding error voltages having the same proportion relative to each other as said time differences, means for selecting two of said error voltages, a first servomotor responsive to said first error voltage, a second servomotor responsive to said second error voltages, means responsive to the output of said first servomotor for pivoting said plotting arm about said datum point, means responsive to the output of said second servomotor for longitudinally positioning said plotting point carrier along said plotting arm, and means responsive to the movement of said plotting point carrier to null out said error voltages whereby said plotting point carrier is substantially positioned at the location of said particular sound source.

8. A sound locating device for use with a sound ranging system wherein a plurality of microphones are employed in a prescribed field of operation to record the relative arrival times of a source of sound, comprising a flat surface, a portion of said surface being calibrated to reproduce said field of operation in miniature and to scale, said calibrated surface having a prescribed datum point, means mounted on said calibrated surface for reproducing in miniature and to scale the location of the field microphones relative to said datum point, an elongated plotting arm operable on said calibrated surface and adapted to pivot about said datum point, a plotting point carrier slidably mounted on said plotting arm, a plurality of potentiometers corresponding in number to the number of field microphones, each of said potentiometers having a relatively rotatable contact arm and resistive element, a direct current potential source, said resistive element being in electrical parallel connection across said voltage source, a discrete guide wire extending through each reproduced microphone location and connecting each of said contact arms to said plotting point carrier, means drivenly connected to each of said resistive elements for indicating the differences in arrival times of a particular sound source at each microphone location with respect to a prescribed microphone location whereby error voltages are initiated between respective resistive elements and contact arms, said error voltages having the same proportion relative to each other as said time differences, means for selecting two of said potentiometer error voltages, and means responsive to one of said selected error voltages for pivoting said plotting arm about said datum point to indicate the azimuth of said particular sound source, means responsive to the other of said selected error voltages for longitudinally positioning said plotting point carrier along said plotting arm to indicate the range of said particular sound source, said guide wires rotating the contact arms of the selected potentiometers in such a manner as to null out said selected error voltages.

9. A sound locating device for use with a sound ranging system wherein a plurality of microphones are employed in a prescribed field of operation to record the relative arrival times of a source of sound, comprising a flat surface, a portion of said surrface being calibrated to reproduce said field of operation in miniature and to scale, said calibrated surface having a prescribed datum point, means mounted on said calibrated surface for reproducing in miniature and to scale the location of the field microphones relative to said datum point, an elongated plotting arm operable on said calibrated surface and adapted to pivot about said datum point, a plotting point carrier slidably mounted on said plotting arm, a plurality of potentiometers corresponding in number to the number of field microphones, each of said potentiometers having a relatively rotatable contact arm and resistive element, a direct current potential source, said resistive element being in electrical parallel connection across said voltage source, a discrete guide wire extending through each reproduced microphone location and connecting each of said contact arms to said plotting point carrier, means drivenly connected to each of said resistive elements for indicating the differences in arrival times of a particular sound source at each microphone location with respect to a prescribed microphone location whereby error voltages are initiated between respective resistive elements and contact arms, said error voltages having the same proportion relative to each other as said time differences, means for selecting two of said potentiometer error voltages, a first servomotor responsive to one of said error voltages and drivenly connected to said plotting point arm to pivot said arm about said datum point, a second servomotor responsive to the other of said selected error voltages and drivenly connected to said plotting point carrier to longitudinally position said plotting point carrier along said arm, said guide wires being responsive to the combined movement of said carrier and said arm to null out said error voltages whereby said carrier is substantially positioned at the location of said particular sound source.

10. The invention according to claim 9, wherein means are provided for maintaining constant tension on said guide wires.

RALPH L. DUNN.

No references cited.